United States Patent [19]

Bardwell et al.

[11] 3,926,264

[45] Dec. 16, 1975

[54] CONTROL CIRCUIT FOR A POWER TOOL

[75] Inventors: Francis G. Bardwell, Elmhurst; Edmund C. Dudek, St. Charles, both of Ill.

[73] Assignee: Thor Power Tool Company, Aurora, Ill.

[22] Filed: Nov. 23, 1973

[21] Appl. No.: 418,762

[52] U.S. Cl. ................................ 173/12; 318/434
[51] Int. Cl.² ........................................ B25B 23/14
[58] Field of Search ........................... 173/12; 91/59

[56] References Cited
UNITED STATES PATENTS

| | | | |
|---|---|---|---|
| 3,322,205 | 5/1967 | Amtsberg et al. | 173/12 |
| 3,439,754 | 4/1969 | Pantel | 173/12 |
| 3,827,506 | 8/1974 | Himmelstein et al. | 173/12 |

*Primary Examiner*—Ernest R. Purser

[57] ABSTRACT

This disclosure deals with a control circuit for a tool including a motor for turning a rotatable power output shaft of the tool. A torque measuring device is coupled to the shaft and generates a signal which is a function of the torque output. The control circuit responds to the torque output and to a reference signal representing a preselected torque, and automatically turns off the motor when the torque output reaches the preselected torque. Further, the control circuit may cyclically turn the tool on and off at very short time intervals as the preselected torque value is being approached, in order to reduce the reaction torque felt by an operator of the tool. In addition, the lengths of the on times in successive cycles may be gradually decreased as the torque output level increases, with the result that the average reaction torque remains substantially constant even though the peak torque output increases.

8 Claims, 19 Drawing Figures

CONTROL CIRCUIT FOR A POWER TOOL

A variety of different torque tools have been developed and are commercially available. For example, electrically powered and air-powered nutsetters are in common use. Such tools often include means for limiting the amount of the torque which is developed by the tool so that the object being driven by the tool will be torqued to a certain limit but not beyond. Such methods of limiting the torque include governor controls and stall arrangements. In addition, some tools such as impact wrenches include means for alternately applying and releasing the torque in order to reduce the reaction torque felt by the operator of the tool.

The foregoing tools have a number of disadvantages. For example, they may be relatively slow in operation and inaccurate as to the amount of torque being applied, and impact wrenches tend to be self-destructive because of the hammering action, thereby resulting in high maintenance costs.

It is a general object of the present invention to provide an improved control circuit for a torque applying tool which avoids the foregoing disadvantages.

It is still a further object of the invention to provide an improved hand-held tool including a control circuit for cyclically turning the tool on and off in order to reduce the reaction torque felt by an operator, and for holding the reaction torque substantially constant.

A control circuit in accordance with this invention is designed for use in a torque tool including a motor connected to turn a power output shaft of the tool, and a switch connected to control energization of the motor. The control circuit includes a torque output level sensing device coupled to the output shaft, for generating a torque signal which is a function of the output torque. The control circuit further includes means providing a reference signal and means for comparing the torque signal with the reference signal, the switch being responsive to the comparing means and deenergizing the motor when a preselected relation exists between the torque and reference signals, this relation existing when the maximum desired torque output is attained.

The control circuit may further include modulating means for repetitively or cyclically turning the motor on and off as torque is being applied, up until the desired torque output is attained. In addition, the control circuit may include means for gradually decreasing the lengths of the on periods in order to further limit the amount of the reaction torque felt by an operator of the tool.

The foregoing and other objects and advantages will be apparent from the following detailed description taken in conjunction with the accompanying figures of the drawings, wherein:

FIGS. 14 to 16 are diagrams of portions of the control circuit; and

While the various forms of the invention are illustrated and described in connection with a hand-held air-powered nut setter, it should be understood that it is equally usable with other types of tools such as screw drivers, and that other powering mediums may be used such as hydraulic power.

Figures 1, 2, 3, 4:
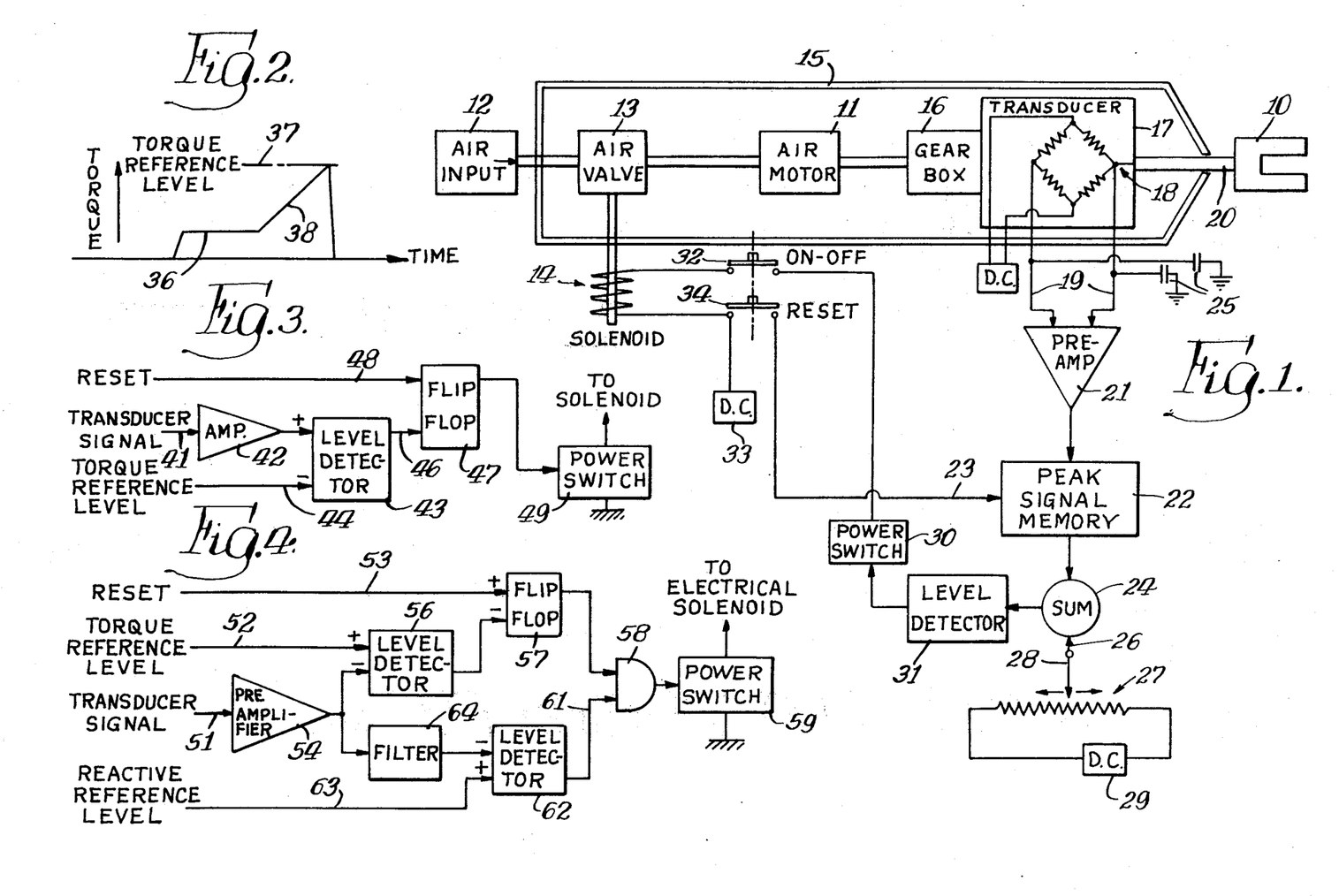
FIG. 1 is a schematic illustration of a tool including a control circuit embodying the invention.
FIG. 2 is a curve illustrating the operation of the control circuit of FIG. 1.
FIG. 3 is a block diagram of an alternate form of control circuit.
FIG. 4 is a block diagram of another form of control circuit.

The tool illustrated schematically in FIG. 1 is a hand-held air-powered nut setter including a socket 10 which is driven by an air motor 11. The air motor 11 receives air from an air input supply 12 and the air flows through an air control valve 13. In the present instance, the valve 13 is controlled by an electric solenoid 14. The air motor 11 is connected to the socket 10 by a gear box 16, and a transducer 17 measures the amount of torque being applied by the socket 10. The components 11, 13, 16 and 17 are enclosed in a housing 15, and the socket 10 is attached to a power output shaft 20 which extends out of the housing.

The transducer 17 comprises, in the present instance, a bridge circuit 18 including variable resistor strain gauges. The details of the transducer 17 are fully described in an earlier filed pending application of the assignee of the present application. The output of the bridge circuit 18 consists of a DC voltage which appears on two output lines 19, the magnitude of the DC voltage being a function of the dynamic torque output of the tool. To make certain that the voltage on the line 19 represents dynamic torque output and not the torque occuring when the tool starts up, two capacitors 25 may be connected between the lines 19 and ground in order to remove any voltage peaks appearing on the lines 19. The DC voltage on the output lines 19 is amplified by a preamplifier 21 and fed to a peak signal memory circuit 22. The memory circuit 22 stores the peak value of the voltage from the preamplifier 21 until it is reset by a reset signal appearing on a reset input 23 of the memory circuit 22. The voltage level at the output of the memory circuit 22 corresponds to the peak voltage received from the preamplifier 21 during the time that the tool is on, and the output of the memory circuit 22 is fed to a level detector 31. Also connected to the detector 31 is a voltage on a line 26, which is derived from a reference potentiometer 27. The potential on the line 26 may be adjusted by an operator of the tool or set by the tool manufacturer by varying the position of the wiper 28 of the potentiometer. The resistive element of the potentiometer 27 is connected across a DC supply 29.

The level detector 31 controls the energization of the solenoid 14. The level detector 31 operates such that current flows through the solenoid 14 until the two input voltages to the detector 31 reach a predetermined value relative to each other. For example, when the two input voltages to the detector 31 are approximately equal, the detector 31 senses this condition and terminates current flow through the solenoid 14.

Connected between the solenoid 14 and the level detector 31 is a normally open on-off switch 32 and a power switch 30. The switch 32 is manually operable and is manually closed by the tool operator to energize or turn on the tool. With the switch 32 closed and the switch 30 turned on by the detector 31, current flows through the switch 30, the switch 32, the solenoid 14 and a DC supply 33, thereby opening the air valve 13 and effecting energization of the tool. However, when the two voltage inputs to the detector 31 are substantially equal, the detector 31 operates to terminate the current flow through the solenoid 14 by opening the switch 30, and the air valve 13 closes, thereby stopping operation of the tool.

Mechanically coupled to the on-off switch 32 is a reset switch 34 which closes a circuit from the DC supply 33 to the peak signal memory circuit 22 at the commencement of each operation of the tool. The purpose of the reset switch 34 is to apply a signal at the input 23 in order to reset the peak signal memory circuit 22.

In the operation of the tool, the operator manually closes the two switches 32 and 34 thereby resetting the circuit 22 and opening the air valve 13 due to energization of the solenoid 14. As the tool operates in order to turn a nut, for example, the torque output of the tool is relatively low at first during the initial running up of the nut, and the voltage out of the memory circuit 22 is represented by the portion of the curve indicated by the reference numeral 36 in FIG. 2. The reference numeral 37 in FIG. 2 represents the reference voltage level on the line 26. When the nut starts to tighten, the output torque voltage from the transducer 17 increases along the upwardly sloping line 38 of FIG. 2, and when the line 38 reaches the torque reference level 37, the level detector 31 detects this fact and actuates the switch 30 to terminate the current flow through the solenoid 14, thereby turning off the tool. The next time the operator turns on the tool, the closure of the switch 34 automatically resets the memory circuit 22 and a new operation begins.

The memory circuit 22 is necessary to prevent the tool from immediately turning on again after it has been turned off as described above. When it is turned off and the operation holds the switch 32 closed, the voltage out of the transducer 17 drops while the reference voltage on the line 26 remains high. If it were not for the memory circuit 22, the drop in the transducer voltage would result in the tool immediately being turned on again. However, the memory circuit 22 holds the peak voltage level and maintains the tool off until it is reset.

In the circuit shown in FIG. 1, the peak voltage from the memory 22 is compared with the torque reference voltage. In the FIG. 3 circuit, the instantaneous voltage representing torque is compared with torque reference voltage level. The output of the transducer 17 is connected to an input 41 of a preamplifier 42 which has its output connected to one input of a level detector 43. The other input of the level detector 43 is connected to receive a torque reference level signal on a line 44 which is connected to a potentiometer such as the potentiometer 27 (FIG. 1). The output of the level detector 43 appears on a line 46 which is connected to the set input of a flip-flop 47. The reset input of the flip-flop 47 is connected to receive the reset signal 23 which appears on a line 48.

At the beginning of the operation of the tool, the reset signal on the line 48 resets the flip-flop 47, and turns on a power switch 49 which is connected to an output of the flip-flop 47 and which actuates the solenoid 14 to open the air valve. When the torque representative voltage at the output of the preamplifier 42 reaches a certain level as compared with the voltage on the line 44, the level detector 43 responds and generates a signal on the line 46 which sets the flip-flop 47. Setting of the flip-flop 47 results in actuating the power switch 49 to close the air valve. The flip-flop 47 then remains in its set state until the next operation of the tool at which time another reset signal appears on the line 48 and resets the flip-flop 47 in preparation for the next operation.

FIG. 4 shows a circuit which is generally similar to the one shown in FIG. 3 but includes means for modulating or turning the air motor on and off at a relatively high rate during the tightening of a nut so that the operator feels only the average reaction torque and not the peak output torque. The operation and construction of the FIG. 4 circuit will be described in connection with FIGS. 5 and 6. With reference to FIG. 4, the transducer output voltage signal appears on a line 51, the torque reference voltage appears on a line 52 and the reset signal appears on a line 53. As in the form of the invention shown in FIG. 3, the transducer signal 51 is passed through a preamplifier 54 to a level detector 56 which also receives the torque reference signal on the line 52. The output of the level detector is connected to one input of the flip-flop circuit 57 which also receives the reset signal appearing on the line 53. The operation of the foregoing described components is generally similar to the operation of the corresponding components illustrated in FIG. 3. The output of the flip-flop circuit 57 is connected through an AND gate 58 and operates a power switch 59. The AND gate 58 passes a signal to control operation of the power switch 59, and an output signal appears from the AND gate 58 only when two input signals are simultaneously received by it. One of the input signals is received from the flip-flop circuit 57, and the other input signal appears on a line 61 which is connected to the output of a second level detector 62. The level detector 62 has two inputs, one of which receives a reaction reference voltage level signal on a line 63 and the other input being connected to receive the output signal of a filter circuit 64. The input of this filter circuit 64 also receives the instantaneous torque voltage from the output of the preamplifier 54.

When the tool is initially turned on, the reset signal on the line 53 resets the flip-flop 57 and a high or positive signal appears at the associated input to the AND gate 58. At the same time, the output of the level detector 62 also provides a high signal at the input 61 and the AND gate 58 produces a high signal to the power switch 59 to turn on the solenoid controlled air valve 13. Operation of the tool results in running up of the nut, with the torque output of the tool being represented by the reference numeral 66 in FIG. 5 and being at a relatively low level. When the nut tightens, the torque output of the tool increases as indicated by the sloped line 67 in FIG. 5. The increasing torque signal level is sensed by the filter circuit 64 and the level detector 62, and at the level indicated by the reference numeral 68 in FIG. 5, the signal on the line 61 becomes low. As will be discussed in connection with FIGS. 11 to 13, at the point 68 the average torque voltage out of the filter circuit 64 is at the level where it exceeds the level on the line 63, and the tool is turned off. As will be explained in connection with FIG. 11, when the filter 64 output signal exceeds the voltage on the line 63 plus an internal feedback signal, the detector 62 output becomes low or negative, switching the output of the AND gate 58 to low and turning off the motor. When the filter output signal falls below the reference voltage on the line 63 minus the previously mentioned feedback signal, the detector 62 output becomes high or positive and the tool is turned on (assuming that the output of the flip-flop 57 is also positive). Thus, the tool is turned on and off as the voltage on the line 51 rises and falls relative to the reference level on the line 63.

Figures 5, 6, 7, 8, 9, 10:
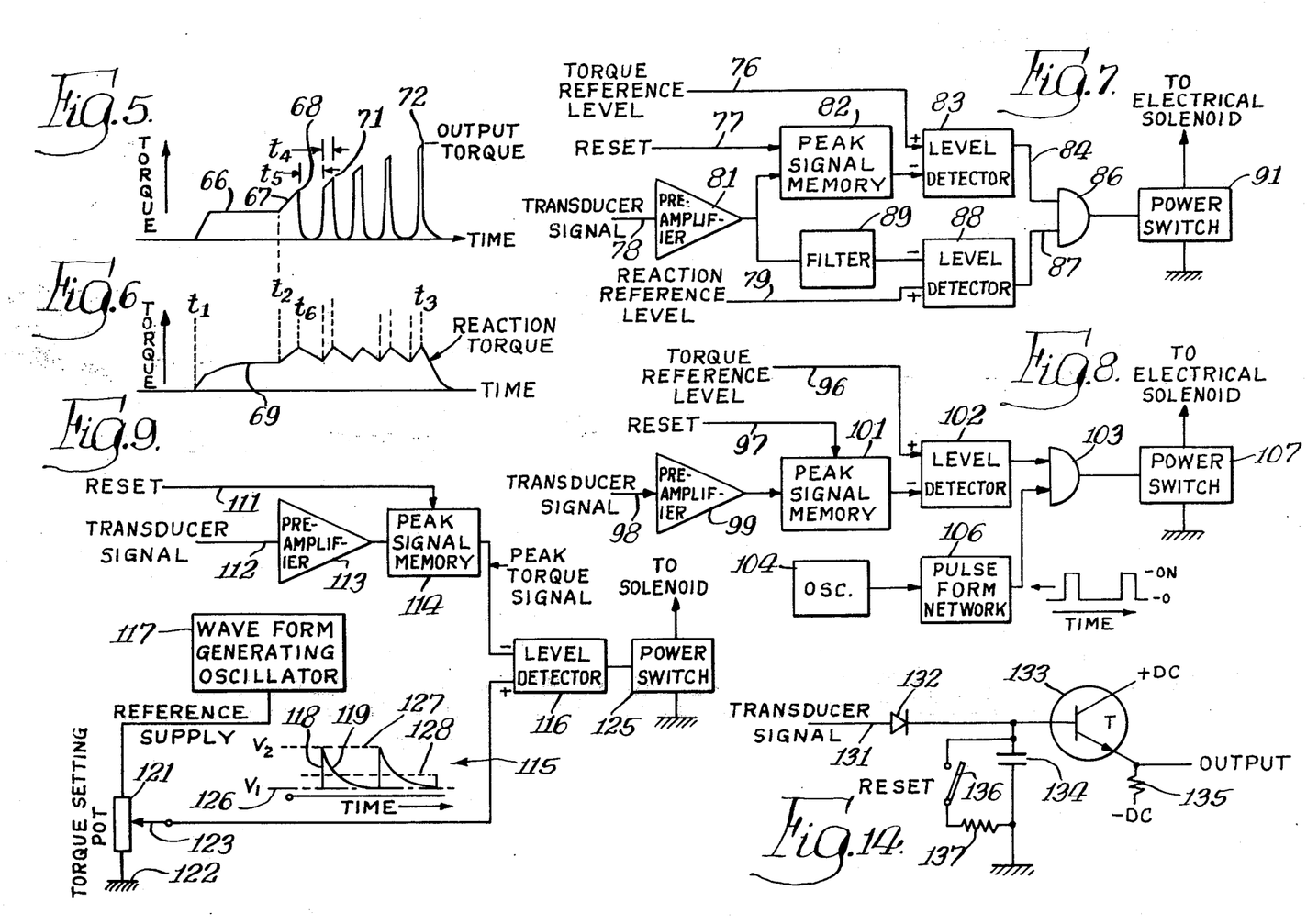
FIGS. 5 and 6 are curves illustrating the operation of the control circuit illustrated in FIG. 4.
FIGS. 7 to 11 are block diagrams of additional forms of the invention.
Figure 10:
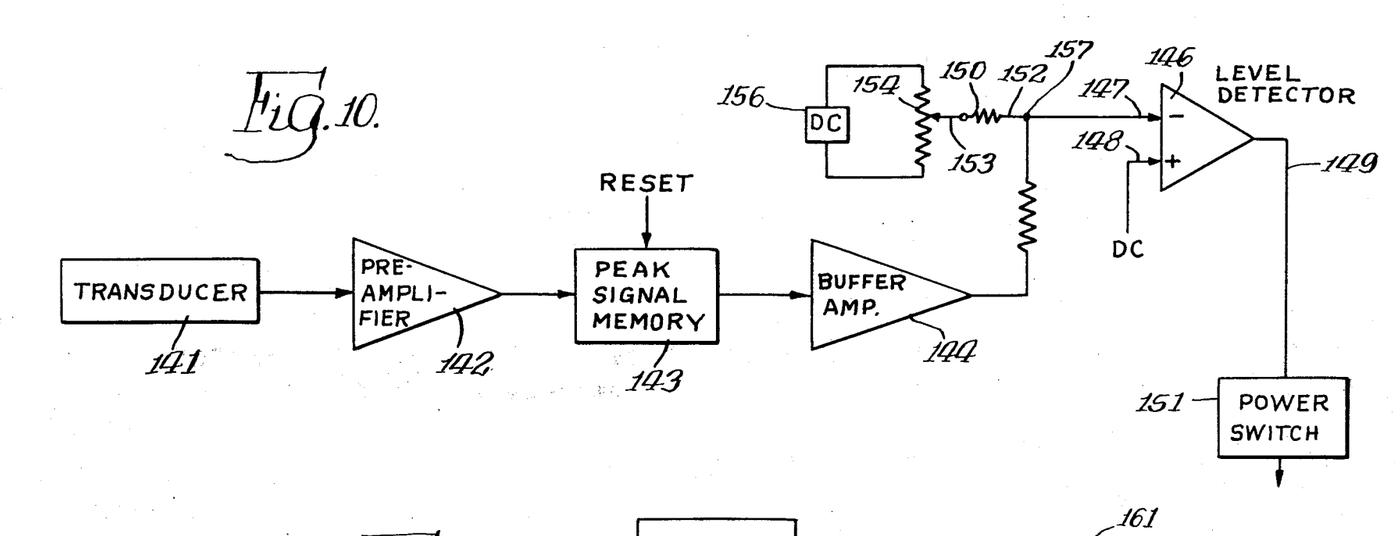

The curve 69 shown in FIG. 6 represents the reaction torque felt by the operator of the tool. After the tool has been turned off for a length of time $t_5$ (FIG. 5), the tool is turned on once again and the peak torque output of the tool rises to the level indicated by the numeral 71 at which time it is once again turned off. As shown in FIG. 5 and explained above, the tool is repeatedly turned on and off by operation of the circuits 58, 62 and 64 in FIG. 4, until the peak output torque of the tool reaches the level indicated by the reference numeral 72 in FIG. 5. At point 72, the output torque is high enough relative to the level on the line 52 that the level detector 56 sets the flip-flop circuit 57, producing a low output signal, turning off the AND gate 58, and turning off the power tool. The tool then remains off until the operator closes the manually operated on-off switch and the reset switch in order to reset the flip-flop 57 and restart operation.

This arrangement has the important advantage in a hand-held tool that the operator feels only the average torque output. The rate at which the tool is turned on and off is made sufficiently high that the mass of the tool absorbs the high peak torques.

The filter circuit 64 and the level detector 62 may be arranged as described in connection with FIGS. 11 and 13 to gradually decrease the lengths of the one-times of the tool as the output torque of the tool increases. This is indicated in FIG. 5 by the gradually decreasing width or time duration of the output torque signals. Due to the gradually decreasing on-time of the tool in each cycle, the average torque, indicated by the line 69 in FIG. 6, remains substantially constant even though the torque output of the tool increases. Consequently, the operator of the tool does not feel the increasing torque output of the tool as the nut is tightened.

FIG. 7 illustrates a circuit which is generally similar to that of FIG. 1 but which includes a circuit for turning the tool on and off in order to average the reaction torque as described in connection with FIG. 4. In FIG. 7, the torque reference level signal appears on a line 76, the reset signal appears on a line 77, the torque transducer output signal appears on a line 78, and the reaction reference level signal appears on a line 79. The transducer signal on the line 78 passes through a preamplifier 81 to a peak signal memory circuit 82 which also receives the reset signal 77. The memory circuit 82 output is passed to a level detector 83 which also receives the torque reference level signal 76. The foregoing described components correspond generally to the corresponding components described in connection with FIG. 1. The output of the level detector 83 appears on a line 84 which is connected to one input of an AND gate circuit 86. The circuit 86 includes a second input 87 connected to a level detector circuit 88 which receives the reaction reference level signal on the line 79 and also the output of the filter circuit 89. The input of the filter circuit 89 is connected to the output of the preamplifier 81.

As described in connection with FIG. 4, the output of the level detector 88 is alternately high and low whereas the output of the level detector circuit 83 reverses only when the peak torque output reaches a certain level. When the peak level is reached, a power switch 91 is actuated to turn off the air valve 13 and stop operation of the tool. At the beginning of the next subsequent operation of the tool, the reset signal in the line 77 resets the memory circuit 82 similar to the resetting of the memory circuit 22 in FIG. 1. Because of the construction of the filter circuit 89 and the level detector 88, as will be described in connection with FIG. 11, the lengths of the successive on-times of the tool gradually decrease as the torque output of the tool increases.

The circuit shown in FIG. 8 operates such that the on-times of the tool remain substantially constant in each cycle. In FIG. 8, the torque reference level signal appears on a line 96, the reset signal appears on a line 97 and the transducer output signal appears on a line 98. The transducer signal on the line 98 passes through a preamplifier 99 to a peak signal memory circuit 101 which also receives the reset signal on the line 97. The output of the circuit 101 and the torque reference level signal on the line 96 are connected to a level detector circuit 102 which has its output connected to an AND gate circuit 103. The foregoing described components are generally similar in operation and construction to the corresponding components illustrated in FIG. 7.

An oscillator circuit 104 is provided to repeatedly turn the tool on and off, the output of the circuit 104 being connected to a pulse forming network 106 which produces a train of pulses. Each of the pulses out of the circuit 106 results in an output signal from the gate 103 which actuates a power switch 107 to open the air valve 13 and turn on the tool. The gate 103 of course produces a high output only when both of its inputs are high. During the time intervals between pulses from the circuit 106, the tool is off. When the peak output torque reaches a predetermined level, as previously described, the output of the level detector 102 becomes low and stops operation of the tool.

The circuit shown in FIG. 9 has some of the advantages of both of the FIG. 7 and FIG. 8 circuits. It will turn on a tool repetitively at fixed intervals, but the lengths of the on-times will gradually decrease as the torque output of the tool increases. With reference to FIG. 9, the reset signal appears on a line 111, and the transducer output signal appears on a line 112, the signal on the line 112 passing through a preamplifier 113 to a peak signal memory circuit 114 which also receives the reset signal on the line 111. The operation of the foregoing components is substantially as previously described. The peak signal memory circuit 114 has its output connected to a level detector 116.

The FIG. 9 circuit also includes a waveform generating oscillator 117 which produces, in the present example, a signal 115 including a train of sharply peaked pulses, the leading side 118 of each pulse rising sharply and the pulse then declining or decaying gradually on the trailing side 119. The resistive element of a potentiometer 121 is connected between the output of the oscillator 117 and a ground or reference potential 122, and consequently the signal appearing on the wiper 123 of the potentiometer is also the same as that of the signal 115, the only difference being that the amplitude of the pulses varies in accordance with the position of the wiper 123. The wiper 123 is connected to one input of the level detector 116, and the output voltage of the level detector 116 will change when the voltage on the wiper 123 is substantially equal to or greater than the torque representative voltage out of the memory circuit 114. The level detector 116 is connected to operate a power switch 125 which is connected to control operation of the air valve of the tool.

In operation, the tool will be continuously on when the peak torque voltage is below the level $V_1$ which is indicated by the numeral 126, the level $V_1$ being the base of reference value of the waveform 115. On the other hand, when the peak torque voltage level is above the reference level indicated by the numeral 127, this voltage also being referred to as voltage $V_2$, the tool is always off. When the tool having the control circuit shown in FIG. 9 is first turned on, a reset pulse appears on the line 111 and resets the peak memory circuit 114. The tool is then turned on and during the initial runup operation, the torque output of the tool is relatively low and the voltage at the output of the peak memory circuit 114 will be approximately equal to or below the reference level 126. However, as soon as the nut starts to tighten, the voltage out of the peak signal memory 114 will begin to rise and will rise above the voltage level 126. Assuming the voltage at the output of the memory circuit 114 is at the level indicated by the dashed line 128, the tool will be on in each cycle for the portion of the cycle which is between the leading side 118 and the trailing side 119 of each pulse produced by the oscillator circuit 117. As the torque output voltage level, indicated by the line 128, gradually rises above the base line 126, the on-time of the tool in each pulse will gradually decrease because the width or distance between the two sides 118 and 119 of each pulse gradually decreases with increased height of the pulse. Consequently, even through the torque output of the tool increases, the on-time in each cycle will decrease, resulting in a substantially constant reactive torque experienced by the operator of the tool.

FIG. 10 is generally similar to FIG. 1 but illustrates an example of a level detector circuit which may be used, including a transducer 141 which generates a variable voltage signal representative of torque as previously explained, a preamplifier 142 connected to the output of the transducer 141, a peak memory circuit 143 connected to the preamplifier 142, a buffer amplifier 144 and a level detector circuit 146. The output of the buffer amplifier 144 is connected to one input 147 of the level detector circuit 146, the circuit 146 including a second input 148 which is connected to a positive DC reference potential. The characteristic of the level detector 146 is such that it switches when the voltage level at the input 147 is substantially equal to or greater than the voltage at the input 148. For example, if the voltage level at the input 148 is a positive 10 volts and the voltage level at the input 147 is initially lower than 10 volts, the output signal on the output line 149 will be at high or positive, and a power switch 141 connected to the output of the level detector 146 will turn the tool on. On the other hand, as the output torque of the tool increases, the voltage level on the line 147 increases and rises to the value of the voltage at input 148, and when they are approximately equal, the voltage at the output 149 switches to a low or negative value, turning the power switch 151 off and stopping operation of the tool.

Also connected to the input 147 is a line 152 which receives a torque reference level voltage. The line 152 is connected through a resistor 150 to the wiper 153 of a potentiometer 154, the resistor element of the potentiometer 154 being connected across a DC supply 156. The line 152 is connected to the input 147 as previously explained along with the output of the buffer amplifier 144, and the juncture indicated by the reference numeral 157 represents a summation point for the voltage output of the amplifier 144 and the voltage on the line 152. The sum of these two voltages appears at the input 147 and is compared at the magnitude of the voltage on the line 148 to control the level detector 146 as previously explained. Thus, the level detector 146 operates as a comparator circuit in that it compares the relative magnitudes of the voltages appearing at its two inputs 147 and 148 and it switches the voltage level at the output 149 of the circuit 146 when the relative input levels reach a predetermined relation. The wiper 153 may be adjusted to a reference or base voltage level in order to change the magnitude of the torque, represented by the voltage out of the amplifier 144, necessary to switch the level detector 146.

Figure 11:
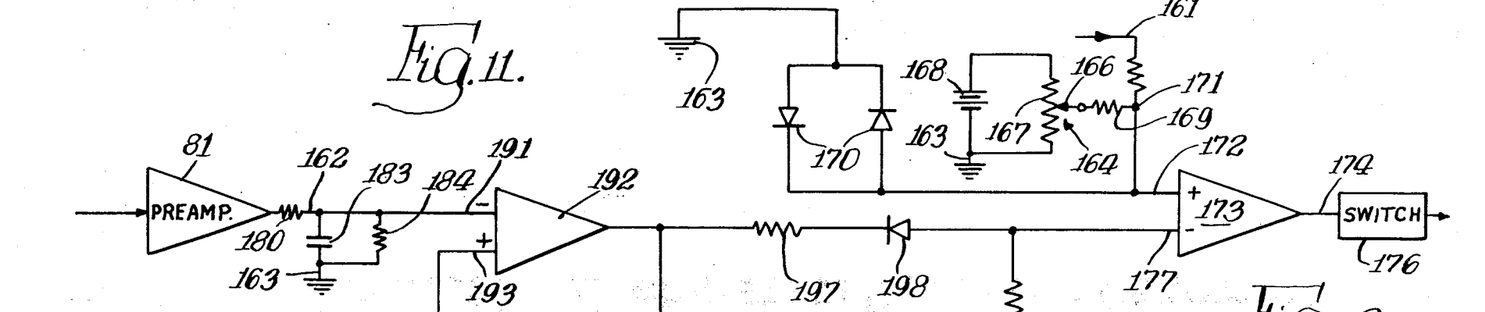
Figure 12:
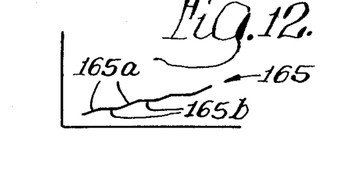
FIGS. 12 and 13 are waveforms illustrating the operation of the circuit shown in FIG. 11.

FIG. 11 illustrates the preferred form and will be discussed in connection with the circuit of FIG. 7. The output signal from the peak signal memory circuit 82 (FIG. 7) appears on a conductor 161 (FIG. 11), and the signal from the preamplifier 81 appears on a conductor 162. A ground or reference potential appears on a conductor 163 and a potentiometer 164 produces the torque reference voltage signal which, in FIG. 7, is on the line 76. The signal on the line 161 is the peak torque signal and consists of a gradually increasing voltage represented by the waveform 165 in FIG. 12. The sloped portions 165a represent the torque when the tool is on and the horizontal portions 165b represent the torque when the tool is off. The resistor element 167 of the potentiometer 164 is connected to the reference potential line 163 and to a DC potential 168. The wiper 166 of the potentiometer 164 is connected through a resistor 169 to a summation point 171 where it is added to the peak voltage signal 165 on the line 161.

The summation point 171 is connected to one input 172 of a level detector 173, the output 174 of the circuit 173 being connected to control operation of a power switch 176. The input 172 is also connected by two back-to-back diodes 170 to the line 163, which holds the potential on the input 172 to less than approximately 1 volt. The circuit 173 includes a second input 177 having a varying voltage level thereon which will be described subsequently.

The voltage appearing on the line 162 represents the instantaneous value of torque, and assuming that the tool is being alternately turned on and off, the voltage on the line 162 will alternately be at a relatively high value and at a relatively low value. When the tool is on, this voltage will be at the level indicated by the reference numeral 181 in FIG. 13, and when the tool is turned off, the voltage on the conductor 162 will drop to the value indicated by the reference numeral 182. The line 162 is connected through a resistor 180 to one side of a capacitor 183 which is connected between the line 162 and the reference voltage line 163, a resistor 184 being connected in the line 162 leading to the capacitor 183. During the presence of the high voltage level 181, the capacitor 183 will charge along the line indicated by the numeral 187 in FIG. 13, and during the time that the voltage on line 162 is at the lower level 182, the capacitor 183 will slowly discharge along the line 188 in FIG. 13. The values of the resistors 180 and 184 and the capacitor 183 of course determine the slopes of the lines 187 and 188. Consequently, the voltage across the capacitor 183 will rise and fall and have an average value indicated by the line 189, and this line 189 is representative of the average reaction torque experienced by the operator of the tool. The voltage across the capacitor 183 is connected to one input 191 of a voltage level detector 192, the detector 192 having a second input 193 which is connected to a reference voltage level provided by a DC potential 194. The output of the level detector 192 is connected through a resistor 197 and a diode 198 to the input 177 of the level detector 173, and the output of the circuit 192 is also connected through a resistor 199 to the input 193 to form a feedback loop. The detector 192 switches and its outut voltage drops when the voltage on the line 191 is at least as high as the reference potential 194 plus the feedback potential through the resistor 199. Further, the detector 192 switches and its output voltage rises when the voltage on the line 191 is below the reference potential 194 minus the feedback potential. For example, if the potential 194 represents 7.5 foot-pounds of torque and the detector 192 output represents either plus or minus 2.5 foot-pounds, the detector 192 will switch at 10 and 5 foot-pounds.

Figure 13:
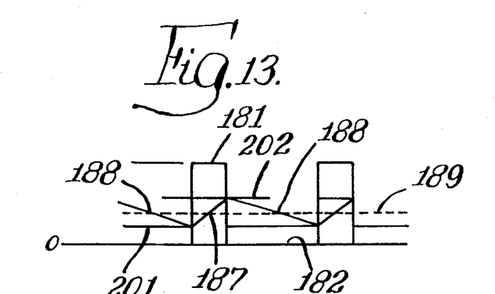

Assuming the tool is being alternately turned on and off as torque is being applied, and that the tool has just been turned off, the voltage across the capacitor 183 will be dropping along the line 188 (FIG. 13). When the voltage level 188 drops to the level 201, the voltage at the output of the circuit 192 switches and its output becomes high. The instantaneous torque then rises to the level 181 and the capacitor 183 gradually charges along the line 187. When the increasing potential on the capacitor 183, represented by the line 187, reaches the level 202, the circuit 192 again switches and the voltage at its output again drops. This cycle of events is continuously repeated until the peak voltage of the waveform 165 on the line 161 rises to the level where it turns off the tool. The level detector 173 also switches and its output goes from low to high or positive when the potential at the input 172 is equal to or higher than the input 177. The DC potential 168 is negative, and the potential on the line 161 gradually increases in the positive direction as shown by the curve 165 in FIG. 12. Thus, the sum of the two potentials at the point 171, if it were not for the diodes 170, starts out at a negative value and increases toward a positive level as the torque output increases. However, as previously mentioned, the diodes 170 hold the input 172 voltage to less than 1 volt.

The input 177 potential varies as the detector 192 output goes positive and negative. When it is positive, the input 177 of the detector 173 is at 0 volt due to the diode 198 and if the input 172 is lower than the input 177, (0 volt) the detector 173 output 174 is low and the tool is turned on. When the detector 192 output is low, the diode 198 conducts and the voltage at input 177 of detector 173 is made more negative than the diodes 170 at the input 172 will permit it to go. Therefore, the detector 173 output is high and the tool is turned off. If the signal 181 of FIG. 13 is in excess of the reference level 202 of FIG. 13, the tool is cyclically turned on and off until the potential of the line 172 rises due to increased torque output, to the point where it is at least as high as the level input 177 which is zero or negative at which time the tool is finally switched off. Consequently, even though the torque output of the tool gradually increases, the average torque experienced by the operator will be that indicated by the reference line 189 in FIG. 13. Further, even though the magnitude of the torque increases as a nut is tightened, the average torque felt by the operator remains substantially constant because the length of time the tool is on in each cycle is gradually shortened. It is shortened because of the increasing voltage level which appears on the line 162 charging the capacitor 183 at a faster rate through resistor 180. Because of the faster rate of charging of the capacitor 183, due to the increased voltage across it, the slope of the curve 187 becomes steeper from one cycle to the next and thereby reaches the level 202 in a shorter length of time. The capacitor 183 and the resistors 180 and 184 form the filters of FIGS. 4 and 7.

FIG. 14 illustrates an example of a peak signal memory circuit which may be used in various circuits disclosed herein. A signal from a torque transducer appears on a line 131 and consists of a positive going voltage. This voltage is connected to the anode of a diode 132, the cathode of the diode 132 being connected to the base of a transistor 133. Between the diode 132 and the transistor 133 is a storage capacitor 134 which is connected between the transistor 133 base and a reference potential. The emitter of the transistor 133 is connected through a resistor 135 to a negative DC potential and the collector of the transistor 133 is connected to a positive DC potential. The signal output is taken from the emitter of the transistor 133. When a positive pulse appears on the line 131 from the transducer, it passes through the diode 132 and charges the capacitor 134. This voltage appears on the base of the transistor 133 and turns the transistor on. When the voltage signal on the line 131 is removed, as by the tool being turned off, the capacitor 134 cannot discharge through the diode 132 and therefore the transistor 133 remains on at the peak level. When another signal appears from the transducer, additional charge is placed on the capacitor 134, and the charge on the capacitor continues to build up as sucessive signals at increasingly high voltages are received. Thus, the capacitor 134 acts as a memory device because it remains at the peak voltage level of the transducer signal.

To discharge the capacitor 134 in order to reset the memory circuit, a reset switch 136 is connected across the capacitor 134. A discharge resistor 137 is connected in series with the switch 136, and when the switch 136 is closed, the capacitor 134 quickly discharges through the resistor 137 thereby reducing the voltage on the base of the transistor 133 to the reference level. While the switch 136 is illustrated in FIG. 14 and being a simple mechanical on-off switch, it should be understood that any other type of switch could be used, such as a solenoid actuated switch, an electronically controlled transistor switch, etc., which will close in response to a reset pulse.

Figure 15:
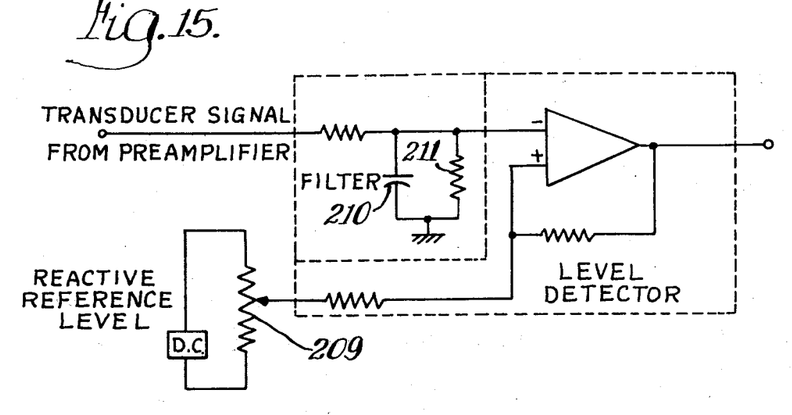

The circuit shown in FIG. 15 is generally similar to that described in connection with FIG. 11, the principal exception being that the reaction reference level 189 may be varied independently of the feedback hysterisis levels. A potentiometer 209 sets the reaction level. In FIG. 15 the signal from the preamplifier appears across a capacitor 210 which is connected in parallel with a resistor 211. The rate at which the capacitor 210 charges therefore is a function of the voltage across it and a function of the value of the resistor 211. After each on-time of the tool, the capacitor 210 partially discharges through the resistor 211.

Figure 16:
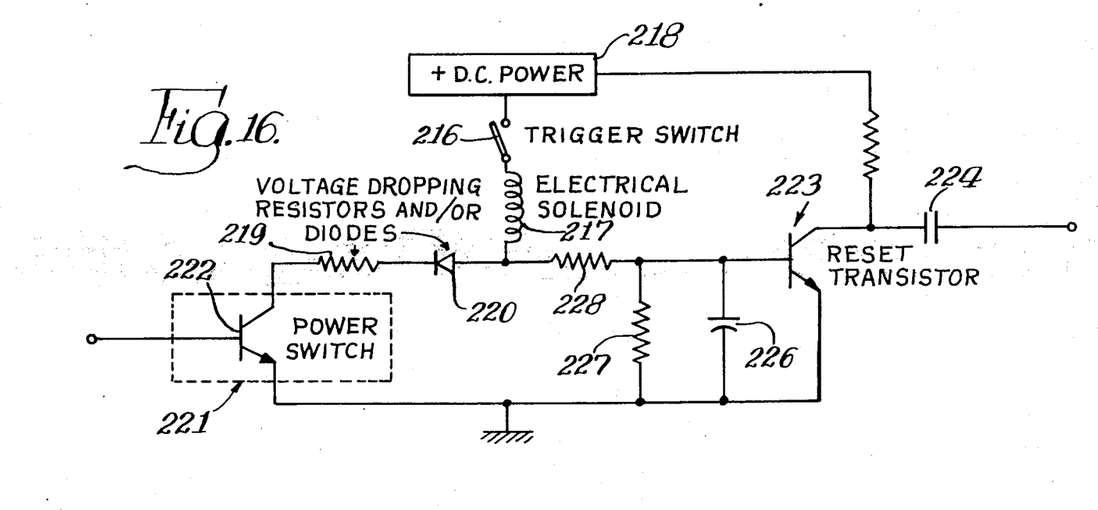

FIG. 16 illustrates an arrangement of a power switch and an operator controlled trigger switch. The trigger switch 216 is connected in series with a solenoid winding 217 that controls the air valve of the tool, and when the trigger switch is closed, current flows from a positive DC supply 218 through the solenoid winding 217, a diode 220, a resistor 219 and a transistor 221 to ground. The base 222 of the transistor 221 is connected to the output of a level detector, and if a positive potential appears on the base 222, the transistor is turned on. Due to the resistor 219 and the diode 218 connected in series with the transistor 221, a positive potential appears between the base and emitter electrodes of a reset transistor 223. When this occurs, the reset transistor 223 is biased on and conducts. Current then flows from the DC supply and through the reset transistor. Prior to the time that the reset transistor 223 is biased on, a capacitor 224 which is connected to the collector of the reset transistor 223 is charged by the DC supply. When the reset transistor 223 is biased on, the capacitor 224 discharges to ground through the reset transistor 223 producing a sharp negative going pulse which is utilized as the reset pulse. The reset pulse may be used to operate a solenoid which resets the electronics of the circuit as previously explained.

To hold the transistor 223 on during the turn on transition of the tool when the solenoid inductor is of high impedance, a capacitor 226 and a resistor 227 are connected across the base-emitter of the transistor 223, and a resistor 228 is connected to the base. The capacitor 226 charges and holds the transistor 223 on until the current through the solenoid is sufficient to produce a large enough voltage drop across components 220, 219, and 221 to turn the transistor 223 on.

Figure 17:
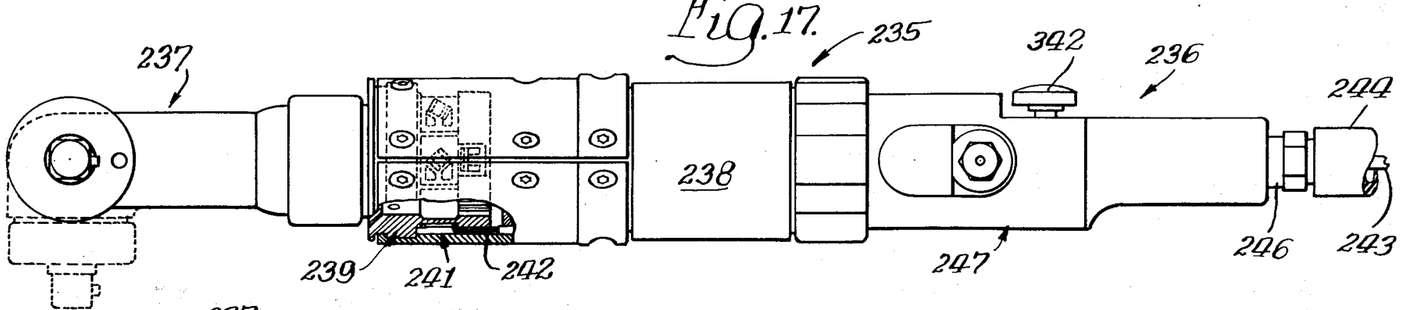
FIGS. 17 to 19 are views of a hand-held tool showing valve arrangements for use with the control circuit.
Figure 18:
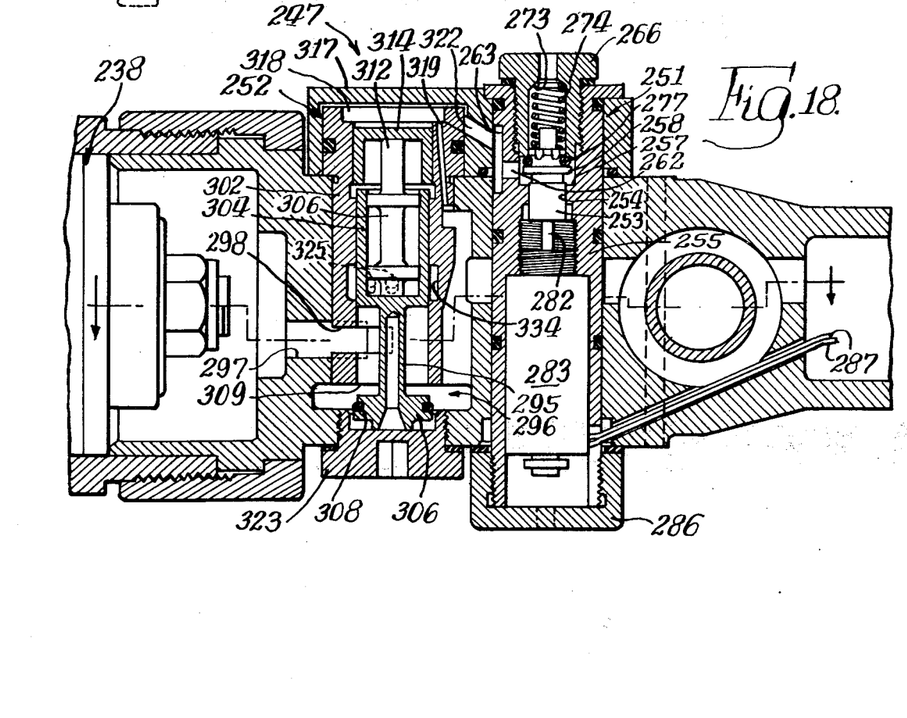
Figure 19:
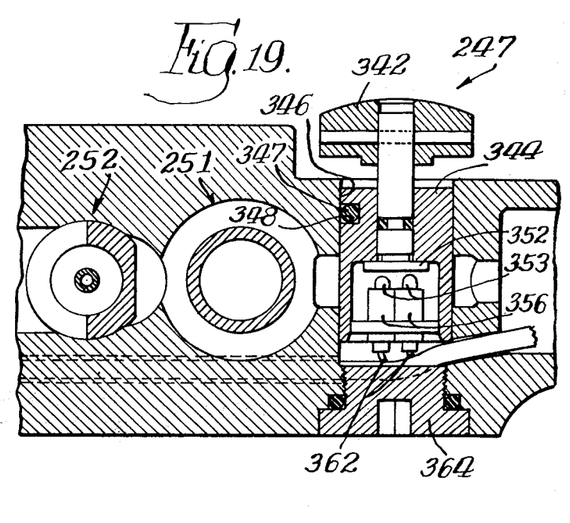

In FIGS. 17 to 19 is illustrated a power tool for use with a control circuit embodying the features of the present invention. The tool R is similar in construction to the tool disclosed in the now pending Edmud C. Dudek U.S. patent applications Ser. No. 359,640, filed May 14, 1973, and Ser. No. 418,779 filed Nov. 23, 1973 and assigned to the assignee of this application.

The tool comprises a nutsetter having an elongated, generally cylindrical tool body 235. A handle assembly 236 is secured to one end of the body and torque output means in the form of a right angle nutsetter attachment 237 secured to the opposite end of the body.

The body 235 includes torque generating means, in the present instance a pneumatic motor 238, as its prime mover. The motor 238 includes a cylinder block and a rotor of a lightweight construction in order to reduce the inertia thereof. The rotor is drivingly connected to the nutsetter attachment 237 through a suitable drive train such as a two-stage planetary reduction gear train 239. A transducer 241, corresponding generally to the transducer 17, for generating a signal proportional to the torque output of the nutsetter attachment 237 is also provided. Such a transducer 241 is described and claimed in the aforementioned Edmud C. Dudek U.S. patent appliation Ser. No. 359,640. The transducer 241 is connected by conductors 242 of an electrical cable 243 which extends through the tool body and through a portion of an air hose 244. The cable 243 emerges from the hose 244 through a suitable junction fitting (not shown) and leads to the remainder of the control circuit.

Air under pressure in the hose 244 enters the tool through a fitting 246 and then flows through passages in the tool to control means in the form of a control valve assembly 247 illustrated in more detail in FIGS. 18 and 19.

The control valve assembly 247 includes a pilot valve portion 251 and a control valve portion 252. The pilot valve portion 251 includes a poppet-type pilot valve 253 which is shiftably mounted in a bore 254 in an elongated bushing 255. The pilot valve bore 254 is counterbored to define a shoulder 257 which is engaged by a flange 258 on the pilot valve 253 when the latter is in its open position. A port 262 intersects the counterbore above the shoulder 257, the outer end of the port 262 registering with an elongated recess or slot 263 in the outer surface of the bushing.

A tubular cap 266 having an internal cylindrical bore therethrough is threaded into another counterbore in the bushing 255, the bore including a reduced diameter portion defining a shoulder 273 near the upper end of the cap as viewed in FIG. 18. The shoulder 273 serves as a seat for one end of a compression coil spring 274, the opposite end of which bears against the pilot valve 253. The lower end of the cap 266 provides a seat for an O-ring 277 mounted on the pilot valve 253. When engaged with the seat 266, the O-ring 277 prevents air from flowing through the port 262 and cap 266 to the atmosphere.

The spring 274 normally urges the pilot valve 253 to its open position and the plunger 282 of a solenoid 283 serves to shift the pilot valve to its closed position illustrated in FIG. 18 when the solenoid is energized. The solenoid 283 is mounted in a counterbore, the lower end of the counterbore being closed by a cap 286.

Current is supplied to the solenoid 103 through a pair of conductors 287 which are routed through a diagonally extending bore in the handle body, the conductors then merging with the cable 243.

The control valve portion 252 of the control valve assembly includes a control valve member 295, which is also of the poppet-type and which serves to control communication between a cavity 296 at the lower end of the valve member, as viewed in FIG. 3, and a generally axially extending passage 297. The cavity 296 communicates by interconnected bores and cavities (not shown) in the tool housing and hence with the air hose 244. Thus, air at line pressure is present in the chamber or cavity 296 when the tool is ready for operation.

The inner or left end of the passage 297 communicates with the inlet ports of the pneumatic motor 238 and the inner or right end of the axial passage 297 registers with a port 298 in a tubular bushing 302, which is mounted in a transverse bore in the tool body closely adjacent to the pilot valve bushing 255. The axes of the pilot valve bushing and control valve bushing are preferably parallel.

As heretofore mentioned, the control valve 252 is of the poppet-type and thus includes a generally disk-like head 306 carried at one end of a stem portion 295. An O-ring 308 is mounted in a circumferential groove in the head 306 for engaging the lower end 309 of the bushing when the control valve member 306 is in its closed position. In order to reduce the weight of the head 306 and steam 295 of the control valve member, they may be internally bored.

The upper end, as viewed in FIGS. 3 and 4, of the stem 295 is connected to the end wall of a cup-shaped guide portion 304 which is slidably mounted in the bore of the control valve bushing 302. A lightweight or low inertia spacer member 306, which may be of Lexan or a similar lightweight, high-strength material, is mounted in the guide portion 304. The spacer member 306 has a rod-like stem portion and a pair of axially spaced cylindrical flanges which closely fit the internal diameter of the guide portion 304. The stem portion has a length greater than the guide portion 304 so that one end 312 thereof extends outwardly of the guide portion 304 and into engagement with the inner surface of the end wall of a cup-shaped cap or piston 314. The cap 314 is slidably mounted in a counterbored portion of the bushing bore, the diameter of the counterbore being somewhat greater than the bore.

An elongated, oval-shaped cover or housing member 317 encloses the upper end of the bushing and defines a chamber 318 at the upper or outer end of the cap 314. The cross-sectional area relationship between the cap 314 and valve guide portion 304 is such that when air at line pressure (about 90 p.s.i.) is present in the chamber 318, the control valve member 295 will rapidly shift downwardly in the bushing to its open position illustrated in FIG. 18 with a force of about 3 lbs. Air under pressure is supplied to the chamber 318 through an inclined bore 319, which is sufficiently small to prevent an excessive flow of bleed air through the pilot valve portion 251 when the tool is inoperative but subject to line pressure in the hose 244. However, the diameter of the bore 319 is not so small as to reduce the response time of the control valve 295. A cap 323 is threaded into the housing and provides a stop limiting downward movement of the control valve member 295, as shown in FIG. 18, and also permits access to the valve for inspection and/or replacement.

Pressurization and venting of the chamber 318 to effect opening and closing of the control valve 294 is controlled by the pilot valve 253. To this end, a diagonally extending bore 322 is provided in the housing, the bore 322 being connected at one end with the chamber 318 and at its opposite end with the recess 263. Consequently, when the pilot valve 253 is in its open position, air under pressure in the chamber 318 will vent to the atmosphere through the diagonal bore 322, recess 263 and port 262 in the pilot valve bushing, and thence through the counterbore and reduced diameter portion of the bore through the cap 266. Since the cross sectional area of the diagonal bore 322 is substantially greater than the inclined bore 319, the pressure in the chamber 318 will be insufficient to unseat the control valve 295 when the pilot valve 253 is in its open position.

In order to effect rapid venting of the chamber of the pneumatic motor 238 when the control valve 295 is in its closed position and thereby effect rapid stoppage of the motor, at least one and preferably two pairs of vent passages 325 are provided in the handle housing for this purpose. The inner ends of the pairs of passages 325 respectively register with a pair of arcuate ports in the control valve bushing and with an annular groove 334 in the bore of the bushing 302. The groove 334 has a width such that the lower or inner end face of the end wall of the cup-shaped guide portion 304 will move past the lower edge of the groove 334 and establish communication between the port 298 and the vent passages 325 when the valve 295 is in its closed position.

The initiation of a torque cycle of the tool is effected by depression of a manually actuated push button 342 (FIGS. 17 and 19). The push button 342 is secured to a stem which is reciprocably mounted in a tubular guide 344, the guide 344 being mounted in a transverse bore 346 in the handle of the tool. The axis of the stem of the button 342 is pendicular to the axes of the pilot valve and control valve bushings. A retaining pin 347 extends through a cross bore in the handle housing and through a slot 348 in the guide 344 for retaining the latter in the housing bore.

The lower or inner end 352 of the stem of the button 342 overlies the plungers 353 of a pair of switches 356 mounted in a cavity in the guide 344. Electrical conductors indicated at 362 are respectively connected to the switches 356 and merge with the cable 243 and are connected to the associated control system for the tool. A plug 364 may be threaded into the handle housing to facilitate installation and/or removal of the switches 362 for servicing or replacement.

Assuming that line air pressure is present in air supply passage of the tool from the hose 244 and in the chamber 296, and that the operator has not depressed the push button 342, the solenoid 283 will be deenergized and the pilot valve 253 will be held in its open position by the spring 274. Consequently, the chamber 318 at the upper end of the control valve 295 will be vented to the atmosphere through the diagonal bore 322, recess 263, port 262 and through the interior of the tubular cap 266. The control valve 295 is biased to its closed position at this time by a force of about 30 lbs.

When the operator depresses the push button 342, the associated control system causes current to be supplied to the solenoid 283 through the conductors 287. The solenoid 283 of course corresponds to the solenoids 14 and 217 of FIGS. 1 and 16. Consequently, the plunger 282 extends and raises the pilot valve 253 to its closed position illustrated in FIG. 18. Communication of the chamber 318 with the atmosphere is thus interrupted and the pressure in the chamber 318 rapidly rises. Such pressure acts on the piston or cap 314 and causes the control valve 295 to be rapidly shifted downwardly toward its open position illustrated in FIG. 18. The force tending to open the control valve 295 is about 3 lbs. and the time required for the control valve to move to either of its open or closed positions is on the order of a few milliseconds. This short response time is due in part to the lightweight construction of the components of the control valve train and the short stroke of the valve, which is about 0.010 inch.

When the control valve 295 opens, air under pressure is supplied to the chamber of the pneumatic motor 238 causing the motor to rotate and torque to be applied to a nut or other fastener with which the nutsetter attachment 237 is engaged. The valve 295 will remain in its open position shown in FIG. 18 while the nut is run down or until the reaction torque on the operator which is also sensed by the transducer 239, reaches a value of about 10 ft. lbs. When this torque level is reached, the signal from the transducer 239 causes the associated control system to interrupt the flow of current to the solenoid 283 and thus permit the pilot valve 253 to shift to its open position and thereby cause the control valve 295 to close.

When used in conjunction with the control circuit of FIG. 7, the control valve 295 will remain closed for a very short interval and then will be caused to rapidly open and close due to a corresponding interruption and establishment of the current flow to the solenoid 283 by the associated control system. Such rapid opening and closing of the control valve 295 causes the torque output of the tool to pulsate or modulate in the manner of an impact wrench. The frequency of the torque pulsations may be about 600 cycles per minute when the tool starts to pulsate and gradually increases to about 700 cycles per minute before the tool shuts off. The result of such pulsating torque output is that the operator of the tool feels a reaction torque which is only an average of the pack torque impulses applied to the fastener by the tool.

When the peak dynamic torque being applied to the joint reaches the desired value, which is likewise sensed by the transducer 239, the associated control system prevents any further current flow to the solenoid 283 and the tool remains shut off. The operator then knows that the torque transaction is complete. He may then release the push button 342 and disengage the tool from the joint. If the operator should release the push button 342 for some reason during a torquing operation and disengage the tool from the joint, the partially completed torque transaction can be reinstated merely by reengaging the tool with the joint and depressing the push button 342. The tool will then pick up at the point where the previous torque cycle was interrupted and then complete the cycle.

While the control circuits have been described in connection with electronic circuits, it should be understood that corresponding fluidic circuits could be used instead. While the description and FIG. 5 indicate that the torque output of the tool falls to zero during the off times, means may be provided in the vent passage 325 to prevent a complete loss of pressure in the tool, thereby preventing the torque outut of the tool from falling to zero during the off times.

We claim:

1. A handheld torque applying power tool, comprising a power output shaft, a drive motor connected to said shaft, means for sensing the torque output of said shaft and for providing a torque signal having a characteristic which represents the torque output level, means for providing a maximum torque reference level signal, reactive reference signal means providing a reference signal of a desired value below said maximum torque level signal, means for comparing said reactive reference signal and said torque output level signal, said means for comparing said reactive reference signal and said torque level signal being operable to turn said motor on and off a plurality of times until the maximum torque is achieved, means for comparing said torque signal and said maximum torque reference signal and providing an output signal when said maximum outut torque level is attained, and motor control switch means connected to control energization of said motor, said switch means being responsive to said maximum torque comparing means for turning said motor off when said maximum output torque level is attained.

2. A power tool as in claim 1, wherein said reactive comparing means operates said control switch means for cyclically turning said motor on and off.

3. A power tool as in claim 2, wherein said reactive comparing means is operable only after a minimum torque level is being produced by said tool.

4. A power tool as in claim 2, wherein the lengths of the on times of said motor are gradually decreased as the torque output level is increased.

5. A power tool as in claim 1, wherein said motor in an air motor which is powered by a supply of compressed air and said tool further includes air valve means connected between said supply and said motor, said valve means being of the poppet type, and said switch means includes solenoid means connected to control operation of said valve means.

6. A power tool as in claim 5, wherein said valve means comprises a pilot valve and a control valve.

7. A power tool as in claim 5, wherein said valve means is fast acting in operation, and further including modulating means connected to said solenoid means for opening and closing said valve means at a high rate of speed.

8. A power tool and control therefor, comprising; a power tool having drive motor means, an output member driven by said drive motor means, control means for controlling the torque generated by said drive motor means, said control means including means for sensing torque, said control means having means for sensing the desired maximum output torque of the tool, means for sensing a threshold torque below said maximum desired torque and providing a threshold torque signal, said control means including means for rapidly pulsing said drive motor in response to said control means sensing said threshold signal until the maximum torque level is achieved, said threshold signal initiating each pulse, said control means including means for automatically terminating operation of said drive motor means upon the application of a predetermined torque to said output member.

* * * * *